US012763516B2

(12) United States Patent
Mattes et al.

(10) Patent No.: US 12,763,516 B2
(45) Date of Patent: Oct. 13, 2026

(54) STRAIN RELIEF DEVICE AND PLUG CONNECTOR

(71) Applicant: Robert Bosch GmbH, Stuttgart (DE)

(72) Inventors: Andreas Mattes, Ludwigsburg (DE); Henrique Stela Ferrari, Bietigheim-Bissingen (DE); Sanganagouda Mallanagouda Hadagali, Bagalkot (IN); Thorsten Kremer, Ludwigshafen (DE); Yongfeng Wu, Wuxi (CN)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 18/600,134

(22) Filed: Mar. 8, 2024

(65) Prior Publication Data

US 2024/0305039 A1 Sep. 12, 2024

(30) Foreign Application Priority Data

Mar. 9, 2023 (DE) ..................... 10 2023 202 092.0

(51) Int. Cl.
*H01R 13/58* (2006.01)

(52) U.S. Cl.
CPC ................................ *H01R 13/5812* (2013.01)

(58) Field of Classification Search
CPC ................................................. H01R 13/5812
USPC ......................................................... 439/470
See application file for complete search history.

(56) References Cited

U.S. PATENT DOCUMENTS 3,980,325 A * 9/1976 Robertson ............. F16L 43/008 285/382.7
5,048,872 A * 9/1991 Gehring ............... H02G 3/0675 411/269
5,072,072 A * 12/1991 Bawa ................... H02G 3/0691 285/151.1
5,866,853 A * 2/1999 Sheehan .............. H02G 3/0675 174/653
7,850,472 B2 * 12/2010 Friedrich ........... H01R 13/6277 439/256

(Continued)

FOREIGN PATENT DOCUMENTS

DE 4024285 C1 10/1991
DE 29811259 U1 8/1998

(Continued)

*Primary Examiner* — Harshad C Patel
(74) *Attorney, Agent, or Firm* — Norton Rose Fulbright US LLP

(57) ABSTRACT

A strain relief device. The strain relief device includes: a lamella element with a base element with a through-opening, set up for feeding through a strand-shaped element substantially parallel to an axial direction, and a lamella which projects from the base element along the axial direction; a clamping body, annular in shape and arranged rotatably on the lamella element radially outside the lamella; wherein the lamella, in a front portion facing away from the base element, is ramp-shaped on its outer side facing the clamping body in the direction of rotation, with a distance to the through-opening that increases along the direction of rotation, and the clamping body has at least one projection projecting radially inward, couples with the front portion of the lamella when there is a rotation of the clamping body and displaces the lamella in a direction away from the clamping body.

13 Claims, 9 Drawing Sheets

(56) References Cited

U.S. PATENT DOCUMENTS

| | | | | |
|---|---|---|---|---|
| 7,938,674 | B2 * | 5/2011 | Lindkamp | H01R 13/59<br>439/461 |
| 8,196,872 | B1 * | 6/2012 | McGrath | F16B 9/054<br>248/65 |
| 9,172,179 | B2 * | 10/2015 | Starke | H01R 13/512 |
| 9,312,629 | B2 * | 4/2016 | Smith | H01R 13/59 |
| 9,490,582 | B2 * | 11/2016 | Jaschke | H01R 13/502 |
| 11,811,160 | B2 * | 11/2023 | Fuehrer | H01R 13/11 |
| 2013/0072050 | A1 * | 3/2013 | Andresen | H01R 9/031<br>439/389 |

FOREIGN PATENT DOCUMENTS

| | | | | |
|---|---|---|---|---|
| DE | 102010037193 | A1 | 3/2012 | |
| DE | 202019106038 | U1 | 11/2019 | |
| EP | 1035619 | A1 | 9/2000 | |
| EP | 2658040 | A1 | 10/2013 | |
| EP | 3490079 | A1 * | 5/2019 | H02G 3/0675 |
| EP | 3535293 | A1 | 9/2019 | |
| WO | 2014027259 | A1 | 2/2014 | |

* cited by examiner

STRAIN RELIEF DEVICE AND PLUG CONNECTOR

FIELD

The present invention relates to a strain relief device and a plug connector having a strain relief device.

BACKGROUND INFORMATION

Strain relief devices for strand-shaped elements (e.g., lines, cables, etc.) are provided to protect sensitive elements that are connected to the strand-shaped element from tensile stress. For example, in an electrical line or in an electrical cable, these can be the connections or contact elements provided at the end of the line, wherein strain relief devices can also be provided for other strand-shaped elements or lines, e.g., media lines. The principle of strain relief is based on fixing the stranded element (e.g., the line or cable or similar) to a fixedly installed and robust object or to a corresponding structure (e.g., in the case of a plug connector, usually a plug connector housing). This ensures that tensile or bending forces that occur on the strand-shaped element do not have a negative effect on elements connected to the strand-shaped element. The strain relief device ensures that the forces acting on the cable or stranded element are absorbed by the structure (e.g., a housing or wall) to which the strain relief element is attached. This allows the forces acting on the elements or components connected to the strand-shaped element to be significantly reduced or completely dissipated. The elements or components connected to the strand-shaped element (e.g., the line or cable or similar) are thus protected by the strain relief device and their function is permanently ensured.

Strain relief devices can, for example, be provided by an element that has lamellae that are pressed against the strand-shaped element from the outside, so that a frictional connection is created. Forces acting on the strand-shaped element (e.g., tensile forces) are then transferred via the lamellae into the associated element and from there into the fixed structure to which the strain relief device is connected or to which it is attached.

A strain relief device is described in European Patent Application No. EP 1 035 619 A1, in which two clamping elements can be clamped in a radial direction on a cable running in an axial direction, and thus provide strain relief. The clamping elements are supported on a plug body. They have bores into which screws are screwed. By tightening the screws, the clamping elements are moved toward the cable in the radial direction and clamp the cable firmly.

German Patent Application No. DE 10 2010 037 193 A1 describes a strain relief device in which a retaining element in the form of a union nut is screwed onto a counter piece that has an external thread. Furthermore, a strain relief element with lamellae is provided, which are arranged around a cable. When the retaining element is tightened, the retaining element is displaced in an axial direction and presses the lamellae projecting from the strain relief element in an axial direction against a cone. As a result, the lamellae are displaced radially inward or away from the retaining element and in the direction of the cable, and clamp the cable firmly.

European Patent Application No. EP 2 658 040 A1 describes a strain relief device in which a clamping element formed as a bracket is placed annularly around a cable that runs in an axial direction. The clamping element has lamellae. The strain relief device further has a cap or sleeve which can be displaced in a sliding manner along the axial direction and has a conical portion. If the cap is pushed over the retaining element, the lamellae are pushed through the conical portion in the direction of the cable and clamp the cable firmly.

A strain relief device is described in European Patent Application No. EP 3 535 293 A1 which consists of two half-shell-shaped elements that are placed around a cable in the manner of a collar and then connected to each other by a clip connection. The cable is thereby clamped between the two half-shell-shaped elements. The strain relief device mounted in this way is then displaced along the cable up to a housing of a plug connector arrangement and fastened to the housing.

SUMMARY

The present invention is based on the realization that forming a strain relief device by screwing in screws in the radial direction is very time-consuming and is not possible, or is only possible with great difficulty, in tight installation situations.

Furthermore, the present invention is based on the realization that the formation of a screw connection (e.g., union nut and a mating element with external thread) requires a minimum path in the axial direction for the displacement of the screw or nut in order to provide a sufficient clamping effect for the formation of an effective clamping. In tight space conditions, this axial path may be very small and is an obstacle to reducing the installation space. In addition, it is often necessary to turn the nut by at least 180°, sometimes even by more than a full turn, in order to effect the clamping: this is because the nut must first be put in place and screwed in so far that the lamellae come into contact with a cone or the like before the clamping effect can even begin. This means increased assembly effort and may require multiple regripping, which is difficult in narrow assembly spaces. Furthermore, the error-free and close-tolerance design of the threads is complicated and cost-intensive in terms of manufacturing. Furthermore, it is difficult in the case of such a solution to meter the clamping force accurately (e.g., by providing a specification for the torque of the screw). Precise metering of the clamping force may be necessary, for example, to effect sufficient clamping on the one hand, but also to prevent crushing of the strand-shaped element (e.g., a line) or its outer layers (e.g., an outer sheath or skin or insulation of the line), especially under difficult visual conditions during installation. This is because it remains unclear how much force or torque is put into the screw connection (friction between thread and mating thread) and how much torque is converted into clamping force on the clamping elements (e.g., lamellae). Finally, such a solution sometimes requires many parts.

In the same way, it has been shown that clamping by means of an axially displaceable sleeve or cap also requires a large axial displacement path, and that here too the clamping force cannot be set precisely without further effort, because it remains unclear how much of the axial force goes into the friction between the components and how much into the clamping.

The present invention is also based on the finding that the formation of a strain relief device by the coupling of two half shells or a plurality of shell elements which are placed around a cable (and then possibly axially displaced in order to fasten them to a housing), is difficult especially in tight installation situations (the half-shells or shell elements can easily fall down), that a relatively large amount of space is required for the assembly (this makes assembly difficult especially in the case of a plurality of strand-shaped elements (e.g., cables) running closely alongside one another), that a relatively large space is required for the axial displacement of the closed half-shells or shell elements, and that the clamping force cannot be precisely metered.

There may therefore be a need to provide a strain relief device which has only a few parts, which is simple and inexpensive to manufacture, which can be installed easily and quickly (even in confined installation spaces and/or in poor visibility conditions) and without a large number of manual operations (e.g., without having to regrip, or without repetitive manual positioning) on the strand-shaped element which is to be strain-relieved, and which occupies only a small constructive space and/or installation space, in particular along the axial direction in which the strand-shaped element runs and in which the clamping force can easily be metered as precisely as possible.

An object of the present invention is to meet this need. Advantageous example embodiments of the present invention are disclosed herein.

According to a first aspect of the present invention, a strain relief device is provided, in particular for a strand-shaped element, in particular for a plug connector, preferably for an electrical plug connector.

According to an example embodiment of the present invention, the strain relief device has a lamella element. The lamella element has a base element with a through-opening. The lamella element further has a lamella which projects from the base element. The strain relief device further has a clamping body which is annular and is arranged rotatably on the lamella element, radially outside the lamella. In a front portion facing away from the base element, the lamella is ramp-shaped on its outer side facing the clamping body in the direction of rotation. The clamping body has at least one projection projecting radially inward, which is designed to couple with the front portion of the lamella when the clamping body is rotated and to displace the lamella in a direction away from the clamping body.

The direction of the longitudinal axis or of a surface normal to the through-opening or the direction in which a strand-shaped element passes through the feed-through opening can be for example designated as the axial direction. A radial direction runs transversely or perpendicular to the longitudinal axis. A direction of rotation runs around the longitudinal axis.

As a result, a strain relief device is advantageously provided which can be produced in a simple and cost-effective manner and which is designed with few parts (ultimately only two elements are required). Further advantageously, the strain relief device can be operated easily and intuitively and safely even under difficult visibility conditions. Further advantageously, the strain relief device requires only a small amount of space, in particular along the axial direction. Another advantage is that a precise clamping effect that can be metered effectively can be achieved simply by rotating the clamping body relative to the lamella element along the direction of rotation (in particular, there is no compulsory axial displacement of the clamping body relative to the lamella element). Furthermore, the clamping effect can advantageously be brought about with only a slight rotation which is for example only a fraction of a full rotation. For example, a rotation through an angle in the range between 10° and 90° C. an be sufficient to achieve a clamping that is well-dosed, e.g., gradually increasing or increasing depending on the angle of rotation, and at the same time sufficiently strong. Further advantageously, the clamping can easily be effected reliably and reproducibly e.g., using a torque tool which executes a rotation up to a well-defined torque.

According to an example embodiment of the present invention, the feed-through opening can for example be set up for the feeding through of a strand-shaped element substantially parallel to the axial direction or in or along the axial direction. The strand-shaped element can for example be a line, a pipe, a cable, or the like.

According to an example embodiment of the present invention, the lamella can project from the base element, e.g., along the axial direction.

The outer side of the clamping body can, for example, have an increasing distance from the through-opening, or from a center or center point or center of gravity of the through-opening, along the direction of rotation.

It can be provided, for example, that the base element has exactly one single lamella. However, more than one single lamella can also be provided on the base element, for example. The term "one/a lamella" can thus be understood as "at least one lamella." can be provided, for example, that the clamping body has exactly one single projection. However, it can also be provided, for example, that more than one single projection is provided for coupling to the clamping body, of which at least one is set up to couple with a lamella. The expression "one/a projection" can thus be understood as "at least one projection".

The lamella can have at least one clamping projection or at least one clamping pin or at least one clamping lug on the side facing the through-opening, in particular in the front portion. The clamping can thereby advantageously be formed at a defined point and/or the clamping pressure can be concentrated on a defined surface, for example on an outer side of a strand-shaped element guided through the through-opening, for example on an insulation of a cable or a wall of a tube or the like.

The design of the lamella in the front section can, for example, be shaped like a rising ramp or a wedge or a (run-up) slope when viewed along the direction of rotation. The slope or the ramp can thereby preferably increase parallel to the direction of rotation or depending on an angle of rotation about the direction of rotation. In particular, a run-up onto the ramp shape does not necessarily lead to an axial displacement of the running-up element (as would be the case with a screw thread, for example). It can be provided that the slope has no (guide) grooves along the direction of rotation.

According to an example embodiment of the present invention, it can be provided, for example, that, viewed along the direction of rotation, the diameter or radius of the outer side of the (ramp-shaped) outer side (in particular in the front section of the lamella) increases with respect to the center or center of gravity or center point of the through-opening, or that the distance of the ramp-shaped outer side from the through-opening or its center increases.

According to an example embodiment of the present invention, the clamping body can for example have a closed annular shape. As a result, it can advantageously apply particularly good and uniformly radially acting forces on the lamella. An annularly closed shape, in particular an annularly contiguous closed shape, advantageously increases the stability of the clamping body. The clamping body can be circular or oval, for example, particularly in cross-section or around the through-opening of the lamella element, although other shapes are also possible. This shape can be present in particular on the inside of a clamping body.

The clamping body and the lamella element can, for example, be elements that are separate from one another, at least before being assembled to one another. The clamping body can, for example, be mounted on the lamella element in the finished strain relief device or can be mounted together with the lamella element.

The lamella can for example have a free end facing away from the base element. For example, it can project from the base element like an arm. It can for example be arranged or fastened on the base element with a lamella root. The lamella can for example be formed in one piece with the base element, e.g., in an injection molding process.

For example, it can be provided that the clamping body is designed to rotate around the lamella element along the direction of rotation around the axial direction or is joined or mounted to the lamella element.

A displacement away from the clamping body can be, for example, a displacement toward the through-opening. A clamping or frictional or non-positive holding of a strand-shaped element inserted through the through-opening can thereby be brought about.

The expression “comprise” is used synonymously with the expression “have”, unless otherwise stated.

In a development of the present invention, it is provided that the lamella element has a plurality of lamellae, the outer sides of which are ramp-shaped in the front portion in the direction of rotation, wherein the clamping body has a plurality of inwardly projecting projections, wherein the projections are set up to couple with the front portions of corresponding lamellae when there is a rotation of the clamping body along the direction of rotation and to displace the corresponding lamellae in a direction away from the clamping body.

A particularly uniform clamping is thereby advantageously brought about. Further advantageously, a redundancy is thereby created in case a lamella and/or a projection is damaged or is no longer functional.

According to an example embodiment of the present invention, it can be provided, for example, that at least one pair of lamellae or a pair of projections are arranged in two different hemispheres (viewed along the direction of rotation).

Preferably, such a pair of lamellae or pair of projections is spaced apart by at least 60°, particularly preferably at least 90°, and particularly preferably at least 120°, viewed in the direction of rotation.

According to an example embodiment of the present invention, it can be provided, for example, that the number of lamellae is greater than the number of projections.

According to an example embodiment of the present invention, it can be provided, for example, that the lamellae are distributed equidistantly along the direction of rotation, or are distributed uniformly along the direction of rotation.

In a development of the present invention, it is provided that the lamella element does not have a thread for coupling to the clamping body.

According to an example embodiment of the present invention, a lamella element which can be produced in a particularly simple and cost-effective manner is thereby provided (no thread is necessary). Further advantageously, the axial space required for the strain relief device is reduced in this way. Further advantageously, the friction force loss when the strain relief device is actuated can be reduced in this way. Further advantageously, operation is thus possible over many assembly/disassembly cycles without risk of wear or cutting of a thread. As a result, an embodiment made of plastic is advantageously also possible for the lamella element and/or clamping body.

Alternatively or additionally, according to an example embodiment of the present invention, it is provided that the clamping body does not have a thread for coupling to the lamella element.

According to an example embodiment of the present invention, a clamping body which can be produced in a particularly simple and cost-effective manner is thereby provided. Further advantageously, the axial space required for the strain relief device is reduced in this way. Further advantageously, the friction force loss when the strain relief device is actuated can be reduced in this way. Further advantageously, operation is thus possible over many assembly/disassembly cycles without risk of wear or cutting of a threading. As a result, an embodiment made of plastic is advantageously also possible for the lamella element and/or clamping body.

It will be understood that the (in particular ramp-shaped) outer side of the lamella does not have a screw thread and also does not have a counter screw thread, at least and in particular in the two developments mentioned above, and in particular does not have a thread pitch or the like.

In a development of the present invention, it is provided that the outer side has at least one rib in the front portion of the lamella, wherein the projection of the clamping body has a latching portion which is set up to couple with the at least one rib in such a way that the clamping body is prevented from rotating opposite the direction of rotation.

According to an example embodiment of the present invention, this is a simple and reliable way of preventing the clamping of the strand-shaped element from weakening by itself after the strain relief device has been actuated, e.g., due to elastic resetting forces after the operating force has been discontinued. In other words, a self-locking is advantageously achieved in that the locking projection or locking portion engages behind the rib and preventing it from rotating back. The rib can act, e.g., in cooperation with the latching projection or the latching portions, in the manner of self-locking of a cable tie.

The latching portion can for example be formed on a free projecting end of the projection.

The at least one rib can for example be formed or run approximately parallel to the axial direction.

The at least one rib can be formed for example in the ramp-shaped region of the outer side.

It can be provided for example that the outer side has a plurality of ribs (which are for example approximately parallel to one another). This allows the clamping force to be adjusted in a well-metered manner: when the latching projection moves over from one rib to the next, the lamella is displaced away from the clamping body by a well-defined distance (the displacement distance can for example depend on the gradient of the ramp or wedge; the displacement distance can for example also depend on the distance from the rib to the preceding rib). Each rib causes a self-locking in the coupling with the latching projection, so that the clamping force can easily be set in small steps. An unlatching can be carried out by a fitter, for example by a strong reverse rotation. For example, an unlatching mechanism may also be provided. For example, it can be provided that a defined axial displacement of the clamping body disengages the latching projection from the at least one rib and thus allows the clamping to be released.

In a development of the present invention, it is provided that the projection has a projection run-up slope. The run-up slope can for example face the outside of the front portion of the lamella.

A particularly low-friction and jerk-free clamping movement of the clamping body is thereby advantageously enabled. Further advantageously, damage to the outer side, or to the rib (s) on the outer side, is thereby prevented, or the risk of such damage is reduced.

The run-up slope can for example preferably be aligned or formed in the direction of rotation. It can be designed in such a way that it first couples or comes into mechanical contact with the outside of the lamella when it rotates along the direction of rotation.

In a development of the present invention, it is provided that the lamella has a first captive anti-loss projection on its outer side, wherein the clamping body has a second captive anti-loss projection on its clamping body inner side facing the lamella, wherein the second captive anti-loss projection is arranged between the first captive anti-loss projection and the base element when viewed in the axial direction, wherein the first captive anti-loss projection and the second captive anti-loss projection overlap with one another, in particular in such a way that the clamping body is held captive on the lamella element.

This has the advantage that the clamping body can be easily mounted on the lamella element, but at the same time the clamping body does not simply fall off or detach from the lamella element in the assembled state, but is securely coupled to it or mounted on it or joined or assembled with it.

For example, it can be provided that the first and second captive anti-loss projections overlap with each other in such a way that the clamping body is held in captive fashion on the lamella element.

In particular, in the assembled state of the clamping body the captive anti-loss securing acts on the lamella element.

The captive securing can, for example, preferably act along the axial direction. It can preferably be designed such that (in the assembled state of the clamping body on the lamella element) it does not oppose or hinder a rotational movement of the clamping body relative to the lamella element.

In a development of the present invention, it is provided that the second captive anti-loss projection has a captive anti-loss run-up slope, in particular facing the base element.

This advantageously causes a particularly simple and rapid coupling of the clamping body to the lamella element, or a particularly simple and rapid assembly of the clamping body on the lamella element.

In a development of the present invention, it is provided that the lamella element has a stop element, wherein the clamping body has a counter-stop element, wherein the stop element and the counter-stop element are designed to cooperate with one another in such a way that they limit an angular range of rotation of the clamping body when there is a rotation of the clamping body along the direction of rotation around the lamella element.

This advantageously prevents the clamping body from over-rotating relative to the lamella element. A fitter is thereby given haptic feedback in a simple manner when the maximum rotational angle range provided for the strain relief or for the clamping effect is reached. If the clamping effect has not been achieved by the time the stop element and counter-stop element meet, the fitter can easily recognize that there is a problem (e.g., a strand-shaped element that is too thin has been used, etc.).

According to an example embodiment of the present invention, the stop element can for example be arranged at the end of the (ramp-shaped) outer side, viewed along the direction of rotation. It can for example be arranged at an outer end of the lamella in its front section, viewed in the direction of rotation.

The counter-stop element can differ from the projection or one of the projections, for example in that it does not have a run-up slope, so that the risk of the counter-stop element simply sliding over the stop element during rotation in the direction of rotation is reduced.

The counter-stop element can for example project less far inward from the clamping body than the projection, viewed along the radial direction. It is thereby advantageously brought about that the counter-stop element does not come into contact with the outside of the lamella, or does so only over a small distance, during a rotation of the clamping body.

A functional separation between the projection and the counter-stop element can thereby advantageously be brought about. The projection displaces the lamella away from the clamping body during a rotation of the clamping body or depending on the rotation of the clamping body. The stopping at the end of the maximum desired rotational range is, on the other hand, caused primarily by the meeting of the stop element and counter-stop element. It can be provided that a lamella swept over by the counter-stop element is not displaced away from the clamping body or is displaced to a lesser extent than a lamella swept over by a projection.

According to an example embodiment of the present invention, it will be understood that the rotation angle range can be in a range between e.g., 5° and 180°, preferably between 7° and 120°, particularly preferably between 10° and 90°, quite particularly preferably between 15° and 60°. For example, the rotation angle range can be 30° or 45°.

According to an example embodiment of the present invention, the rotation angle range can for example be dimensioned from the beginning of the rotation of the clamping body, at which it is positioned with the projection just at the beginning of the ramp-shaped outer side of the corresponding lamella, up until the stop element meets the counter-stop element. It can also be dimensioned such that a first end of the rotation angle range is given by the contact of a first side of the counter-stop element with a first side wall of a first lamella (e.g., a rear side of the stop element of the lamella) and a second end by the contact of a second side of the counter-stop element with the stop element (e.g., its front side) of the next lamella in the direction of rotation.

According to an example embodiment of the present invention, viewed along the direction of rotation, it can be provided for example that exactly one single counter-stop element is provided or that a plurality of counter-stop elements are provided. It can be provided that, in the case of a plurality of counter-stop elements, these are spaced evenly or equidistantly from one another along the direction of rotation. For example, it can be provided that a projection is formed adjacent to a counter-stop element. It can be provided that a regular sequence of projections and counter-stop elements results.

According to an example embodiment of the present invention, it can be provided, for example, that the sum of the number of projections and the number of counter-stop elements corresponds to the number of lamellae.

In a development of the present invention, it is provided that the stop element is formed on the front portion of the lamella and projects in the radial direction toward the clamping body, wherein the counter-stop element projects radially inward from the clamping body.

According to an example embodiment of the present invention, this advantageously brings about a particularly simple and reliable determination of the maximum desired or permitted rotation angle range. Furthermore, in this way the forces acting on the stop element and counter-stop element when there is a rotation, or the torque acting on them in the event of a meeting, are advantageously particularly low, so that the elements are particularly well protected against breaking or damage. Further advantageously, the stop element and counter-stop element can in this way be designed to be particularly stable and large, since they are located substantially at the outer edge of the through-opening. Further advantageously, in this way the lamellae can be used in a simple manner both for the displacement by means of a projection and to prevent an over-rotation. This advantageously allows the clamping body to be assembled on the lamella element in many different rotational orientations. Assembly is thereby facilitated.

In a further development of the present invention, it is provided that the clamping body has a profiling on an outer side.

The use of a tool is thereby advantageously facilitated by means of which the rotational movement of the clamping body can be carried out in a well-defined manner and/or in an automated manner (for example in a production line).

The profiling or the profile can be selected, for example, from the group: an outwardly projecting wing, a plurality of outwardly projecting wings, a slot, a plurality of slots, a polygonal profile, in particular a triangular profile, a tetragonal profile, a pentagonal profile, a hexagonal profile, a heptagonal profile, an octagonal profile, a nonagonal profile, a decagonal profile, etc.

The profiling or the profile can furthermore advantageously ensure that the rotation of the clamping body cannot be carried out using just any tool. A securing against unauthorized or accidental rotation can thus be achieved.

According to a second aspect of the present invention, a plug connector, in particular for plugging together with a mating plug connector, is provided. For example, this can be an electrical plug connector for plugging together with an electrical mating plug connector.

According to an example embodiment of the present invention, the plug connector has a plug connector housing with a feed-through opening for feeding through a cable. The plug connector also has a strain relief device as described above.

This advantageously provides a plug connector with a particularly space-saving and easily actuated strain relief. In the strain relief, the clamping force can further advantageously be adjusted to the cable or the line in a particularly simple and well-metered manner. Further advantageously, the clamping force can be set with a single-handed rotation without the need for regripping or resetting several times when setting the clamping force. This makes it possible to provide a plug that is particularly reliable and easy to use or install. In other respects, the same advantages result as described above.

According to an example embodiment of the present invention, the plug connector can for example have at least one contact element. The at least one contact element can for example be a female contact element or a male contact element. The plug connector can for example have at least one contact chamber, in particular in or on the plug connector housing, in which a contact element can be or is mounted.

The contact element can be arranged at a contact-side end of the connector housing in such a way that it can be coupled or plugged together or electrically connected to a mating contact element of the mating connector.

According to an example embodiment of the present invention, the plug connector can for example have a cable or a line. The line or cable can for example be routed into the plug connector housing at a cable-side end of the connector housing (e.g., facing away from the contact-side end). The cable or the line can for example have an insulation and at least one electrically conductive line. The cable can for example be electrically and/or mechanically connected to the contact element, in particular to the electrically conductive line.

According to an example embodiment of the present invention, the plug connector can for example be provided or set up as a plug connector for vehicle applications, for example for automobiles, or can be used for this purpose. It can be for example a plug-in connector for high-voltage applications (e.g., at least 42 V, preferably at least 100 V, particularly preferably at least 200 V), and/or a plug-in connector for high-current applications (for example for currents of more than 1 A or more than 10 A or more than 50 A). An electrical line of the plug connector can for example have a cross section of at least 1 $mm^2$ or at least 5 $mm^2$ or at least 10 $mm^2$ or at least 50 $mm^2$. Strain relief devices are particularly advantageous for such plug connectors in order to prevent high-power-transmitting components (e.g., contact elements) from tearing off or coming loose from the cable or an electrical line.

For example, the strain relief device can be provided on or in a cable entry portion of the plug connector housing. The strain relief device can be used to secure the cable or line in such a way that any tensile forces acting on the cable or line cannot cause damage inside the plug connector housing or inside the plug connection (e.g., to the contact elements or their connection to the cable or line).

In a development of the present invention, it is provided that the strain relief device is fastened to the plug connector housing, in particular is releasably fastened.

According to an example embodiment of the present invention, the plug connector can thereby be produced in a simple and cost-effective and modular manner. In the same way, the strain relief device can be produced In a simple and cost-effective manner and used for different plug connector housings. Furthermore, a damaged strain relief device can advantageously be replaced easily, making possible a repair of the plug connector and improving sustainability.

In a development of the present invention, it is provided that the plug connector has an end cap which covers a, or the, cable-side end of the plug connector housing, wherein the strain relief device is formed integrally with the end cap.

The strain relief device can thereby be fastened to the plug connector housing in a particularly simple and secure manner. At the same time, the forces absorbed by the strain relief device (e.g., tensile forces, bending forces, shear forces, rotational forces, etc.) can be introduced into a force absorption structure (here: the connector housing) particularly easily, safely, and reliably. Further advantageously, this brings about an accumulation of functions, which leads to a reduction of individual parts. This is because the strain relief end cap formed in this way protects the cable-side end of the plug connector housing from the ingress of fluid media, dirt, and soiling, and at the same time enables the relief of components (e.g., contact elements, shielding elements, etc.) located in the interior of the plug connector housing from forces that act on the cable from outside the plug connector housing (e.g., tensile forces, bending forces, shear forces, vibration forces, rotational forces, etc.)

BRIEF DESCRIPTION OF THE DRAWINGS

Further features and advantages of the present invention will become apparent to a person skilled in the art from the following description of exemplary embodiments of the present invention, which however are not to be interpreted as limiting the present invention, with reference to the figures.

DETAILED DESCRIPTION OF EXAMPLE EMBODIMENTS

Figure 1:
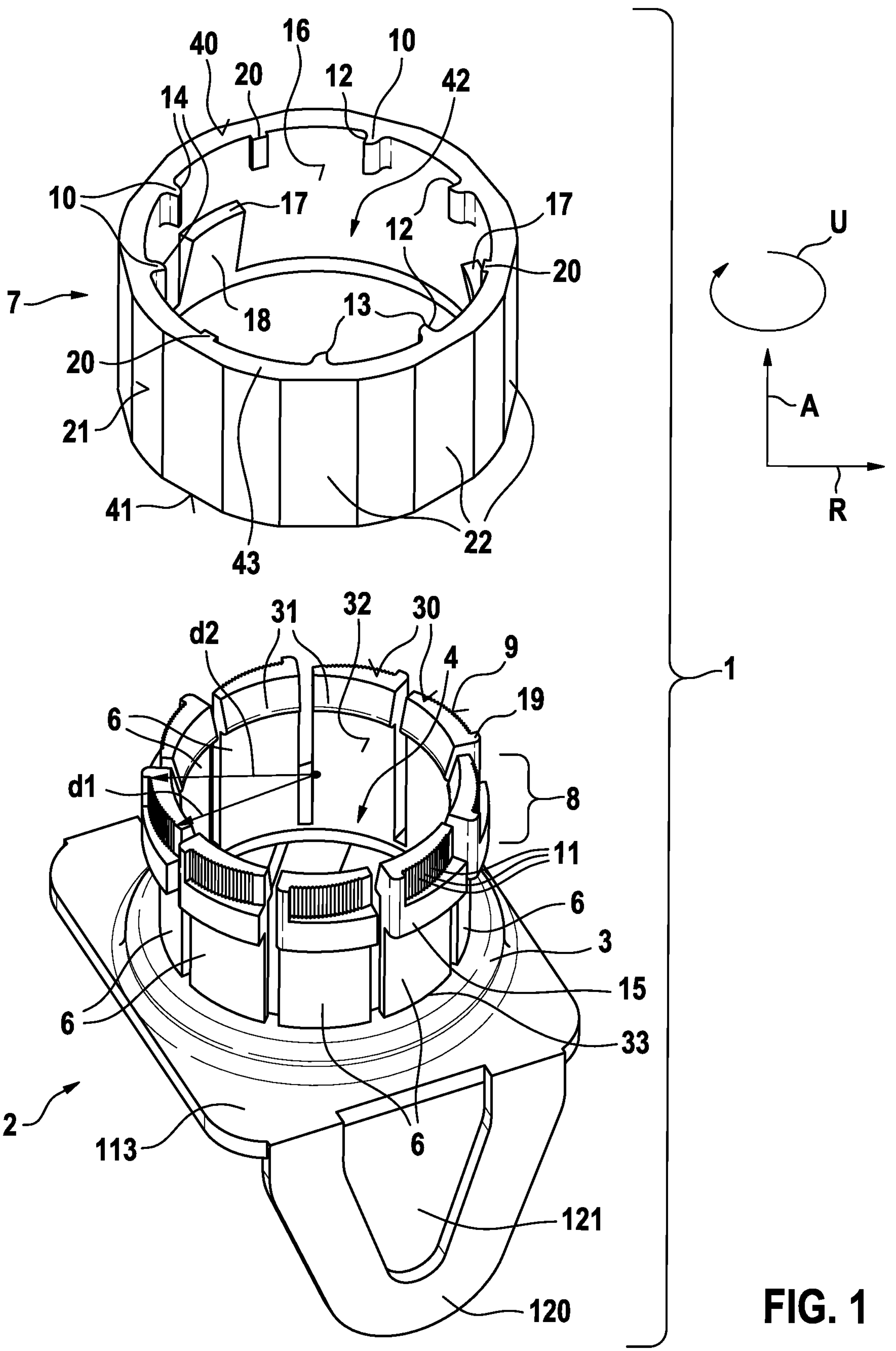
FIG. 1 is a schematic perspectival exploded view of a strain relief device, according to an example embodiment of the present invention.

FIG. 1 shows a schematic perspective exploded view of an exemplary embodiment of a strain relief device 1. The strain relief device 1 has a lamella element 2 with a base element 3. The base element 3 has a through-opening 4, which is set up in particular for the feeding through of a strand-shaped element 5 in or essentially parallel to an axial direction A. The strand-shaped element can be, for example, a tube, a line, a cable 112 (see for example FIG. 3A to 5) or the like. The lamella element 2 furthermore has at least one lamella 6 which projects from the base element 3, in particular along the axial direction A. In this exemplary embodiment, a plurality of lamellae 6 are provided on the lamella element 2. Overall, nine lamellae 6 are provided here by way of example. The strain relief device 1 furthermore has a clamping body 7 which is annular and can be arranged rotatably on the lamella element 2, radially outside the lamella 6, or is arranged on the lamella element 2 in the assembled state (see FIG. 2C to 5). The at least one lamella 6 (here: all lamellae 6) is made ramp-shaped or wedge-shaped or rising in the direction of rotation U in a front portion 8 facing away from the base element 3 on its outer side 9 facing the clamping body 7, in particular with a distance d1, d2, increasing along the direction of rotation U, from the through-opening 4 or from its center or center of gravity or center point (see also FIGS. 3A and 3B). The clamping body 7 has at least one projection 10 projecting radially inward or toward the through-opening 4. Six projections 10 are provided here by way of example. The at least one projection 10 is set up to couple with the front portion 8 of the at least one lamella 6 during a rotation of the clamping body 7, and to displace the lamella 6 in a direction away from the clamping body 7. In this embodiment, each of the six projections 10 shown is set up to couple with one of the nine lamellae 6 (i.e. with a corresponding lamella 6) and to displace this corresponding lamella 6 radially inward (i.e. away from the clamping body 7) in the direction of the feed-through opening 4 (see also FIG. 3A to 4B).

As already described, in the embodiment shown, the lamella element 2 has a plurality of lamellae 6 (nine lamellae 6), the outer sides 9 of which are designed to be ramp-shaped or wedge-shaped or rising in the direction of rotation U in the front portion 8, wherein the clamping body 7 has a plurality of inwardly projecting projections 10 (six projections 10), wherein the projections 10 are set up to couple with the front portions 8 of corresponding lamellae 6 during a rotation of the clamping body 7 along the direction of rotation U and to displace the corresponding lamellae 6 in a direction away from the clamping body 7 (here: radially inward) (see also FIG. 3A to 4B).

Here, the axial direction A runs through the through-opening 4. The radial direction R extends perpendicular to the axial direction A and the direction of rotation runs around the axial direction A.

Here, the lamellae 6 are designed to be self-supporting by way of example. They are arranged or held on the base element 3 with or in a lamella root 33. Here, they project by way of example along the axial direction A from the base element 3 and, by way of example, have a free lamellae end 30. The front portion 8 is here formed by way of example at the free lamellae end 30. At least one lamella 6 (here by way of example: all lamellae 6) can have a clamping projection 31 which faces radially inward (toward the through-opening 4). This is formed here, for example, in the area of the free lamella end 30 on a lamella inner side 32. The clamping projection 31 allows the clamping force to be applied to the strand-shaped element 5 at a well-defined point during the clamping process of the strain relief device 1 and ensures a secure clamping (high line pressure).

Here the clamping body 7 has a closed ring shape as an example. It has a clamping body wall 43 which surrounds a clamping body through-opening 42. Here it is designed by way of example as a sleeve open at both distal ends. The clamping body 7 has a first end face 40 which faces away from the lamella element 2 (pointing upward in FIG. 1). The clamping body 7 has a second end face 41 which faces the lamella element 2 (pointing downward in FIG. 1).

Here, the lamella element 2 does not have for example a thread for coupling to the clamping body 7, and here the clamping body 7 also does not have for example a thread for coupling to the lamella element 2.

The (ramp-shaped) outer side 9 in the front portion 8 of the lamella 6 has here, by way of example, at least one rib 11; in this case a plurality of ribs 11 are provided as an example. The projection 10 of the clamping body 7 (here, by way of example: each projection 10) has a latching portion 12, in particular on a free projection end 13, which is set up to couple with the at least one rib 11 in such a way that the clamping body 7 is prevented from rotating opposite the direction of rotation U. In other words, during the rotation of the clamping body 7 and the resulting coupling of the projection 10 and the outer side 9, a self-locking effect is created in order to prevent unintentional and/or independent rotation back. During rotation (here along the clockwise direction), the latching projection or the latching portion 12 or the free projection end 13 move one after the other over the individual ribs 11 of the plurality of ribs 11. As soon as it has moved over one of the ribs 11, the respective rib 11 (which here runs approximately in axial direction A) forms an undercut behind which the latching section 12 engages at the free projection end 13 of the projection 10. In this way, the clamping force (which is caused by the displacement of the lamellae 6 radially inward) caused by the rotation of the clamping body 7 can be adjusted in a very targeted manner, and here, as an example, in steps. Once the clamping force has been applied, it is permanently secured by the interaction of ribs 11 and latching portion 12.

The projection 10 (here: all projections 10) has a projection run-up slope 14. This projection run-up slope 14 faces, by way of example, the outer side 9 of the front portion 8 of the lamella 6. It enables a particularly low-friction and jerk-free rotation of the clamping body 7 when the clamping force is applied.

The lamella element 2 further has a stop element 19, by way of example. By way of example, the clamping body 7 has a counter-stop element 20, wherein stop element 19 and counter-stop element 20 are designed to cooperate with one another in such a way that they limit a rotational angle range WB (see FIGS. 3A and 3B) of the clamping body 7 during a rotation of the clamping body 7 about the lamella element 2 along the direction of rotation U. In other words, the clamping body 7 can be rotated around the lamella element 2 only within a maximum provided angle of rotation or angle of rotation range WB (without causing damage). At the end of the maximum angle of rotation, the counter-stop element 20 abuts against the stop element 19 and further rotation is prevented.

In the embodiment, shown only as an example, the stop element 19 is formed on the front portion 8 of the lamella 6 and projects in the radial direction R toward the clamping body 7 or away from the through-opening 4 (here radially outward). The counter-stop element 20 projects radially inward from the clamping body 7. By way of example, here the counter-stop element 20 does not have a run-up slope. It projects radially inward less far than does projection 10. In this way, the counter-stop element does not couple with the (ramp-shaped) outer side 9 of the front portion 8, or does so only at the end of a rotation. This means that when there is a rotation of the clamping body 7 relative to the lamella element 2, the lamella 6 swept over by the counter-stop element 20 is not displaced away from the clamping body 7 (here radially inwardly), or at least is displaced less than a lamella 6 swept over by one of the projections 10 (see also FIGS. 3A and 3B).

In the embodiment shown, each lamella 6 has a stop element 19. The stop element 19 is provided in each case at the end of the outer side 9 in the front portion 8 (viewed in the direction of rotation U). Thus, nine stop elements 19 are provided here by way of example. Three counter-stop elements 20 are provided here by way of example on the clamping body 7. These are here arranged equidistantly from one another by way of example, in this case each offset from one another by 120° along the direction of rotation U.

On the clamping body 7, the projections 10 and the counter-stop elements 20 are arranged here, only as an example, at substantially the same height when viewed along the axial direction A (here in the immediate vicinity of or adjacent to the first end face 40 of the clamping body 7). Here, as an example they are regularly distributed in the direction of rotation U: each two projections 10 are followed by a counter-stop element 20.

It goes without saying that other distributions of projections 10 and counter-stop elements 20 are also possible.

Furthermore, it is possible (not shown here) that stop element 19 and counter-stop element 20 are not arranged at the same height or not in the same portion along the axial direction A as the (ramp-shaped) outer side 9 or the projections 10. For example, stop 19 and counter-stop 20 can be arranged in the region of the lamellae root 33 (the stop 19) or in the region of the second end face 41 of the clamping body 7 (the counter-stop 20). In this way, for example, more projections 10 could be provided on the clamping body 7, so that, for example, a projection 10 is provided for each lamella 6.

The clamping body 7 here has for example a profile or profiling 22 on a clamping body outer side 21. As a result, the clamping body 7 can be gripped and rotated particularly easily by hand and/or can be securely gripped or grasped with a tool designed to be complementary to the profiling 22 or to the profile, in order to thus apply a torque, even a precisely defined torque, to the clamping body 7. The profiling 22 can be selected for example from the group: a wing, an outwardly projecting wing, a plurality of outwardly projecting wings, a slot, a plurality of slots, a polygonal profile (as in the present embodiment). A polygonal profile can be designed for example as a triangular profile, a tetragonal profile, a pentagonal profile, a hexagonal profile, a heptagonal profile, an octagonal profile, a nonagonal profile, a decagonal profile, etc.

The lamella 6 (here the plurality of lamellae 6) has a first captive anti-loss projection 15 on its outer side 9. On its inner side 16 facing the lamella 6, the clamping body 7 has at least one second captive anti-loss projection 17 (here for example three second captive anti-loss projections 17, of which two are visible in FIG. 1). When the clamping body 7 is assembled to the lamella element 2 (see e.g., FIG. 2C), the second captive anti-loss projection 17 is arranged between the first captive anti-loss projection 15 and the base element 3, viewed in axial direction A, with the first captive anti-loss projection 15 and the second captive anti-loss projection 17 overlapping with one another. The overlap here is designed in particular such that the clamping body 7 is held captive (but rotatable) on the lamella element 2.

As an example, the first captive anti-loss projection 15 on the lamella 6 is here arranged, viewed along the axial direction A, between the lamella root 33 and the front portion 8, or the free lamella end 30. Here, as an example it directly adjoins the front portion 8 with the ramp-shaped outer wall 9.

The second captive anti-loss projection 17 here has, by way of example, a captive anti-loss run-up slope 18 facing the base element 3. The clamping body 7 can thereby be assembled particularly easily and without damage to the lamella element 2.

Figure 5:
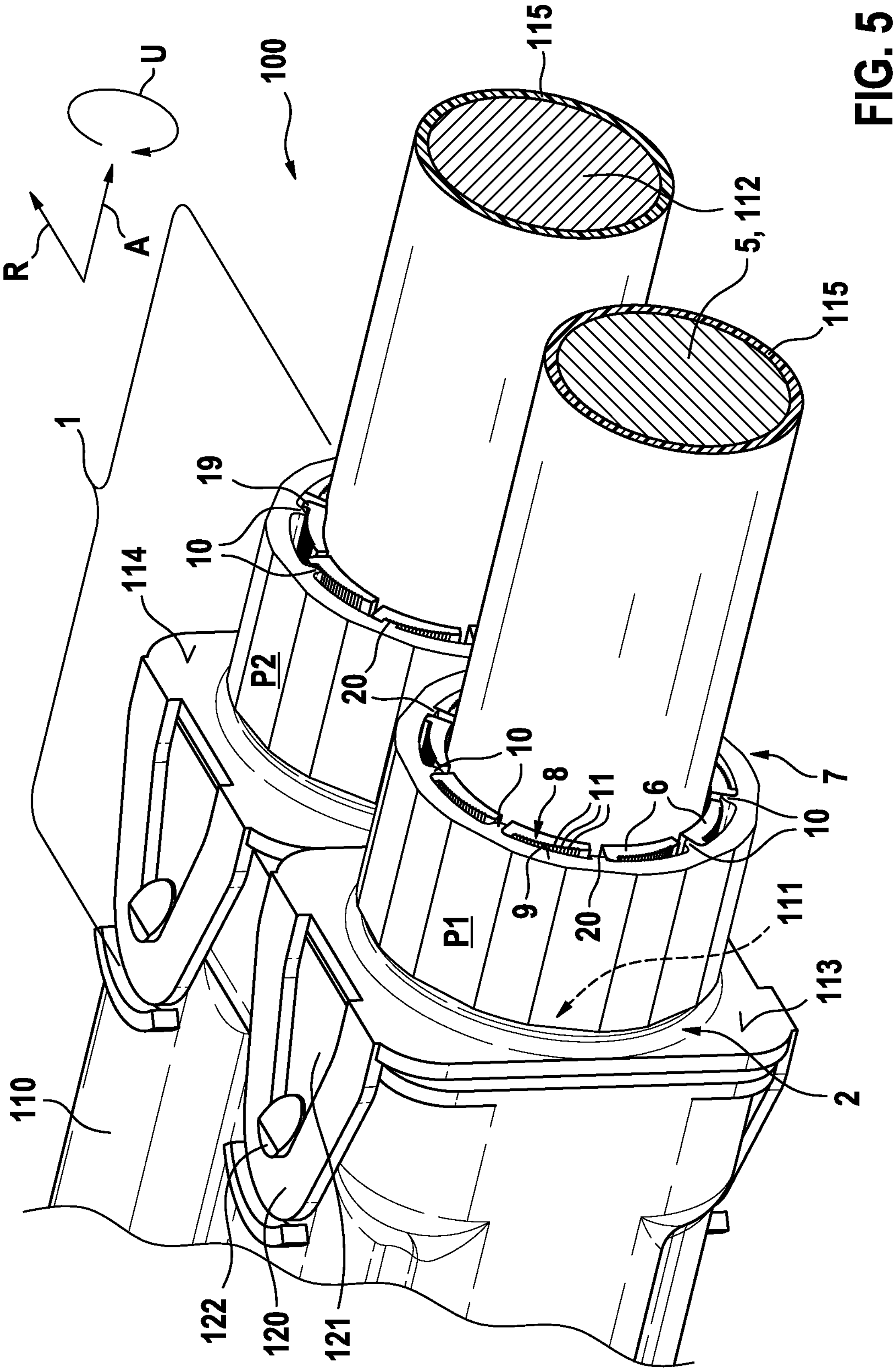
FIG. 5 shows is a schematic perspective view of a plug connector with a strain relief device, according to an example embodiment of the present invention.

The strain relief device 1 is here, by way of example, formed integrally with an end cap 113 for a plug connector housing 110 of a plug connector (see FIG. 5). Here, as an example the lamella element 2 is formed integrally with the end cap 113. The lamella element 2 is flat in the area of its base element 3 and extends substantially rectangularly as a flat, plane-like element. Furthermore, two tabs 120 with recesses 121 are provided on the base element 3 or the end cap 113, which can be fastened to a latching projection 122 (see FIG. 5) of the plug connector housing 110 (see FIG. 5).

Figure 2A:
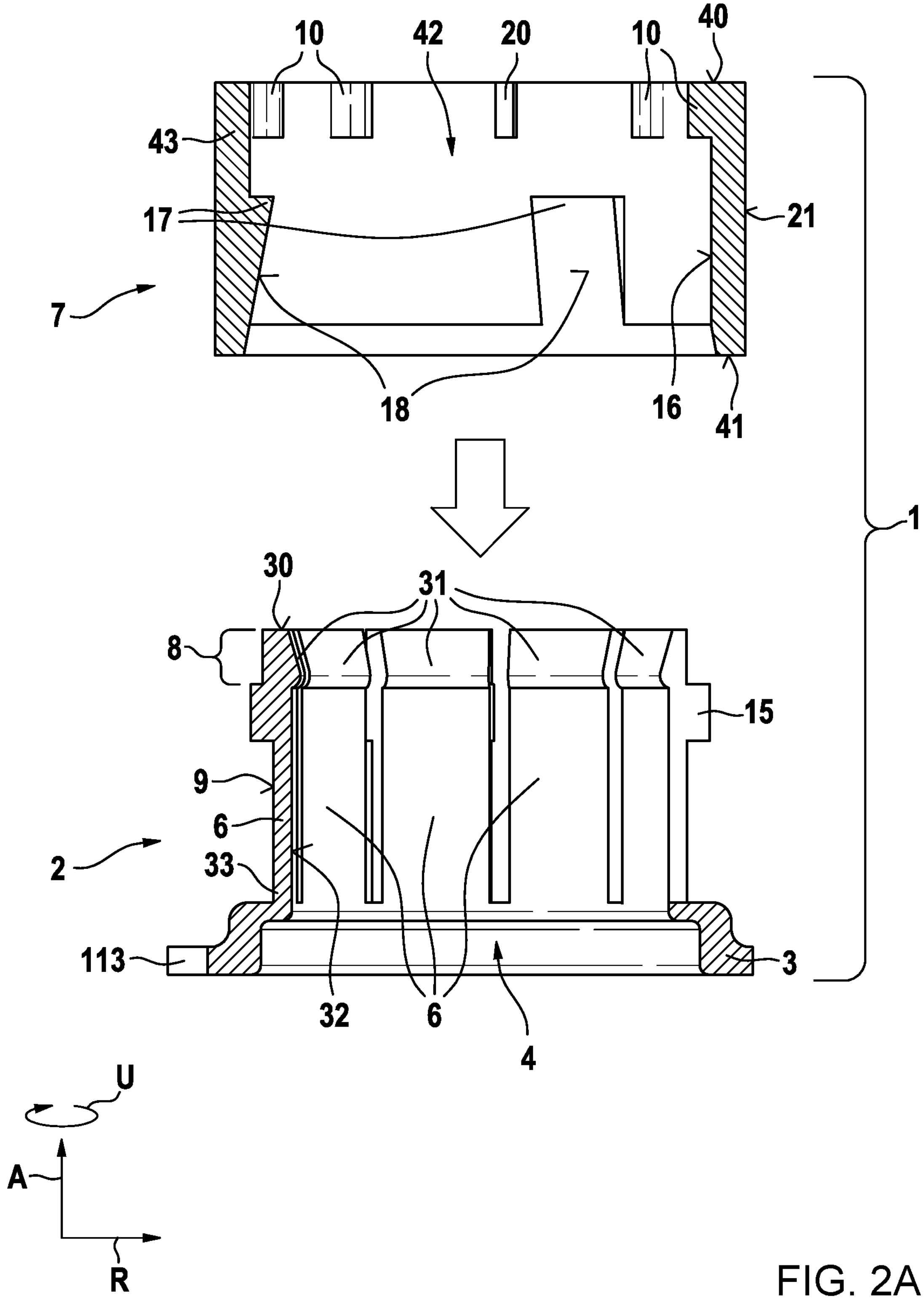
FIG. 2A to 2C show schematic longitudinal sections through a strain relief device in different assembly states of a clamping body on a lamella element, according to an example embodiment of the present invention.
Figure 2B:
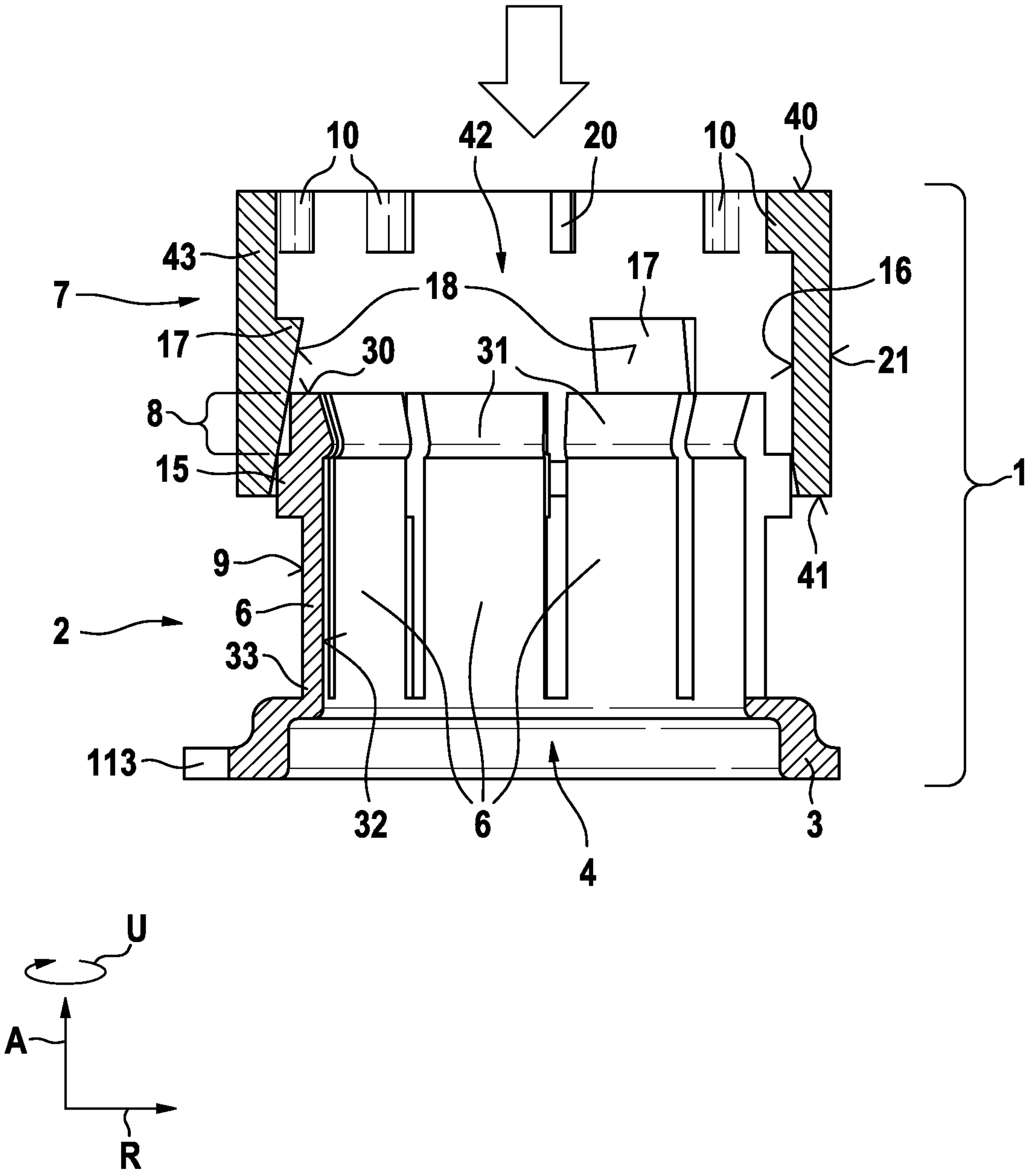
Figure 2C:
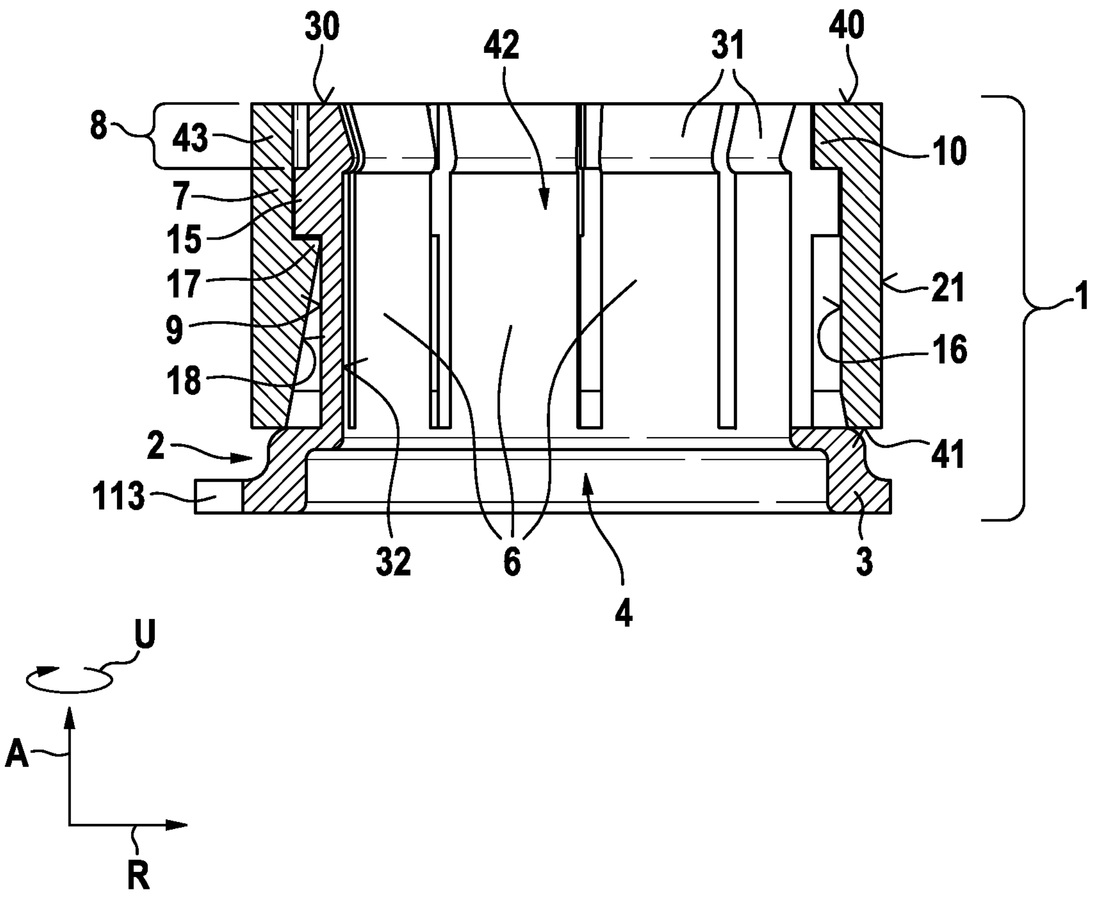

FIGS. 2A to 2C show schematic longitudinal sections through a strain relief device 1 in different assembly states of a clamping body 7 on a lamella element 2.

FIG. 2A shows a first state in which the clamping body 7 is still completely separated from the lamella element 2. It can be seen that the clamping body 7 is to be pushed parallel to the axial direction A along the arrow over the free lamellae ends 30.

FIG. 2B shows a second state in which the assembly process is in progress. The clamping body 7 is pushed with its clamping body wall 43 over the plurality of lamellae 6, and the captive anti-loss run-up slope 18 on the inside 16 of the clamping body 7 or the clamping body wall 43 runs straight onto the first captive anti-loss projection 15 of the corresponding lamellae 6 and begins to bend the corresponding lamellae 6 radially inward.

FIG. 2C shows a third state in which the assembly process is complete. The clamping body 7 is now attached or assembled in a captive manner on the lamella element 2. The strain relief device 1 is finished. If the clamping body 7 is moved away from the lamella element 2 in the axial direction A, the second captive anti-loss projection 17 of the clamping body 7 abuts against the first captive anti-loss projection 15 of the lamella (e) 6, whereby a further movement and thus a release of the clamping body 7 from the lamella element 2 is prevented. In the present embodiment, each lamella 6 has a first captive anti-loss projection 15 and the second captive anti-loss projection 17 is here, viewed by way of example in the direction of rotation U, wider than the distance between two adjacent first captive anti-loss projections 15. As a result, the clamping body 7 can in principle be rotated in any desired manner about the lamella element 2 without releasing the captive securing.

It is understood that the assembling of the clamping body 7 to the lamella element 2 can take place before the strain relief device 1 is attached to the strand-shaped element 5 or before the strand-shaped element 5 is inserted through the through-opening 4. In principle, however, it is also possible for the clamping body 7 to be assembled to the lamella element 2 only after the strand-shaped element 5 has been inserted or pushed through the through-opening 4 of the lamella element 2.

It should also be noted that the clamping body 7 can here by way of example be mounted on the lamella element 2 in different rotational orientations, which considerably simplifies assembly. In principle, a coding is also possible so that the clamping body 7 can be mounted on the lamella element 2 only in one or a few positions (along the direction of rotation U) (not shown here).

Figure 3A:
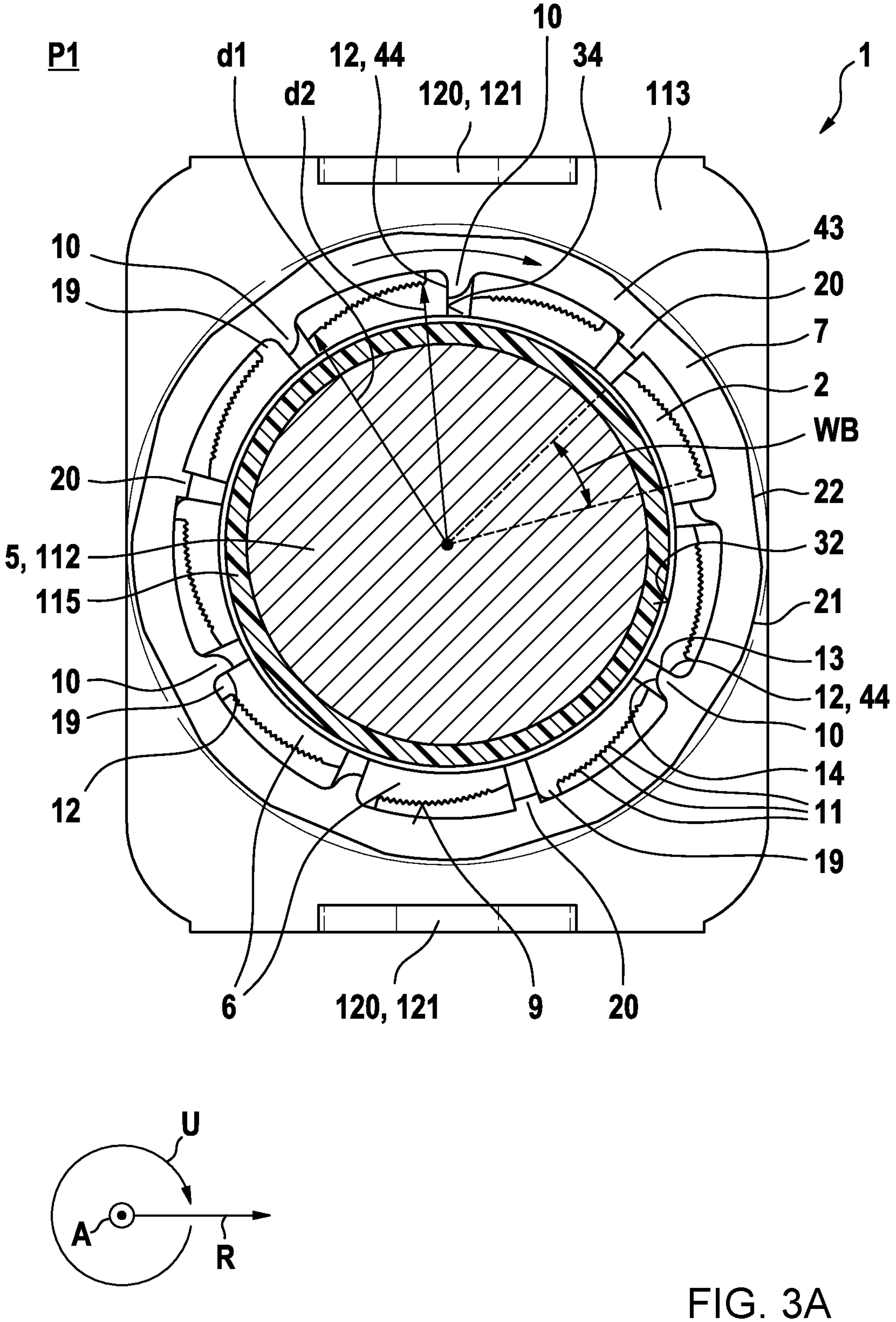
FIGS. 3A and 3B are schematic plan views of a strain relief device in an open state (FIG. 3A) and in a clamped state (FIG. 3B), according to an example embodiment of the present invention.
Figure 3B:
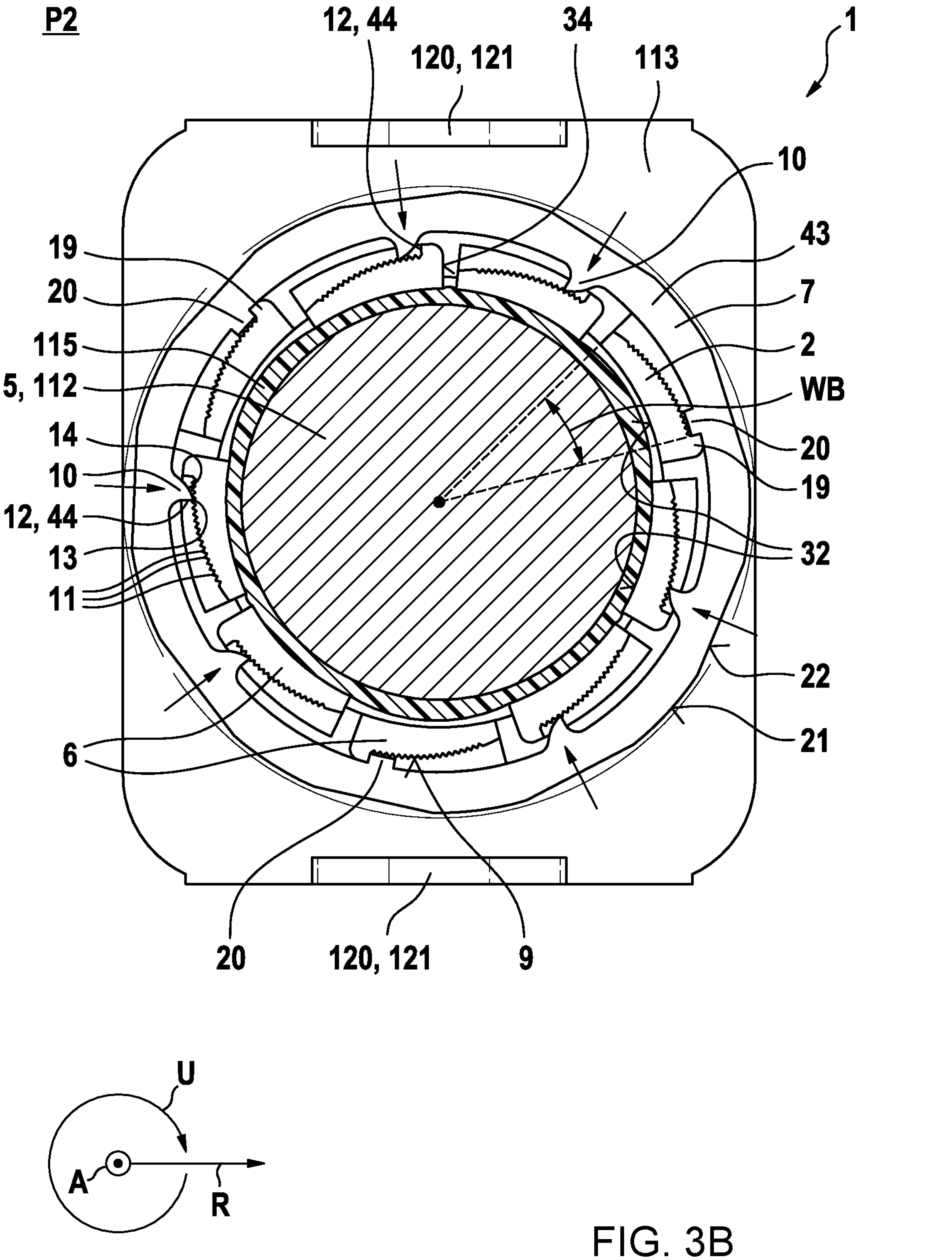

FIGS. 3A and 3B show schematic plan views of a strain relief device 1 in an open state or non-clamping state (FIG. 3A) and in a clamped state (FIG. 3B). In both Figures, a strand-shaped element 5, e.g., a cable 112 of a plug connector 100 (see FIG. 5), is inserted through the through-opening 4 of the lamella element 2 and the clamping body through-opening 42.

FIG. 3A shows a first position P1 (starting position) of the clamping body 7 relative to the lamella element 2. It can be seen that the inner sides 32 of the lamellae 6 are slightly spaced apart from the strand-shaped element 5 or lie only loosely on the strand-shaped element 5. A clamping has not yet been formed. No strain relief is taking place yet.

The projections 10 rest with steeply (almost vertically) sloping rear sides 44 against side surfaces 34, pointing in the direction of rotation U, of lamellae 6 (in the present example, the side surfaces 34 are each arranged counter-clockwise next to the rear sides 44). By way of example, the side surfaces 34 here merge into the stop element 19.

FIG. 3B shows a second position P2 (end position) of the clamping body 7 relative to the lamella element 2. It can be seen how, after a rotation (here clockwise, by way of example), the projections 10 with their projection run-up slopes 14 and the latching portion 12 have slid over the (ramp-shaped) outer side 9 of the corresponding lamella 6 and, with increasing rotation, have displaced the corresponding lamella 6 in the direction of the through-opening 6 (here: radially inward) (see also the arrows pointing radially inward). The diameter between the lamellae 6 is thereby reduced and the strand-shaped element 5 is successively clamped. The projections 10 here latch with the latching portion 12, in each case behind the last swept-over rib 11. This results in a self-locking (because the lamellae 6 are elastically reversibly pushed radially outwards by the strand-shaped element 5), and unintentional backward rotation of the clamping body 7 is prevented.

Over-rotation of the clamping body 7 in the direction of rotation U (here: clockwise) beyond a maximum angle of rotation is prevented by the shown abutment of the counter-stop elements 20 against the stop elements 19. This results in a (maximum) rotational angle range WB for the rotation of the clamping body 7 which cannot be exceeded (without force). The (maximum) angle of rotation range WB is given here as an example by the difference in the angle of rotation of the clamping body 7 between the first position P1 in FIG. 3A and the second position P2 in FIG. 3B.

It will be understood that a desired or sufficient clamping can already be achieved in a position which lies between the first position P1 and the second position P2.

It can also be clearly seen in FIG. 3B that the lamellae 6 swept over by the three counter-stop elements 20 are not displaced radially inward or away from the clamping body 7, or are so displaced only to a very small extent. This results from the fact that the counter-stop elements 20 project radially inward less far than do the projections 10.

Figure 4A:
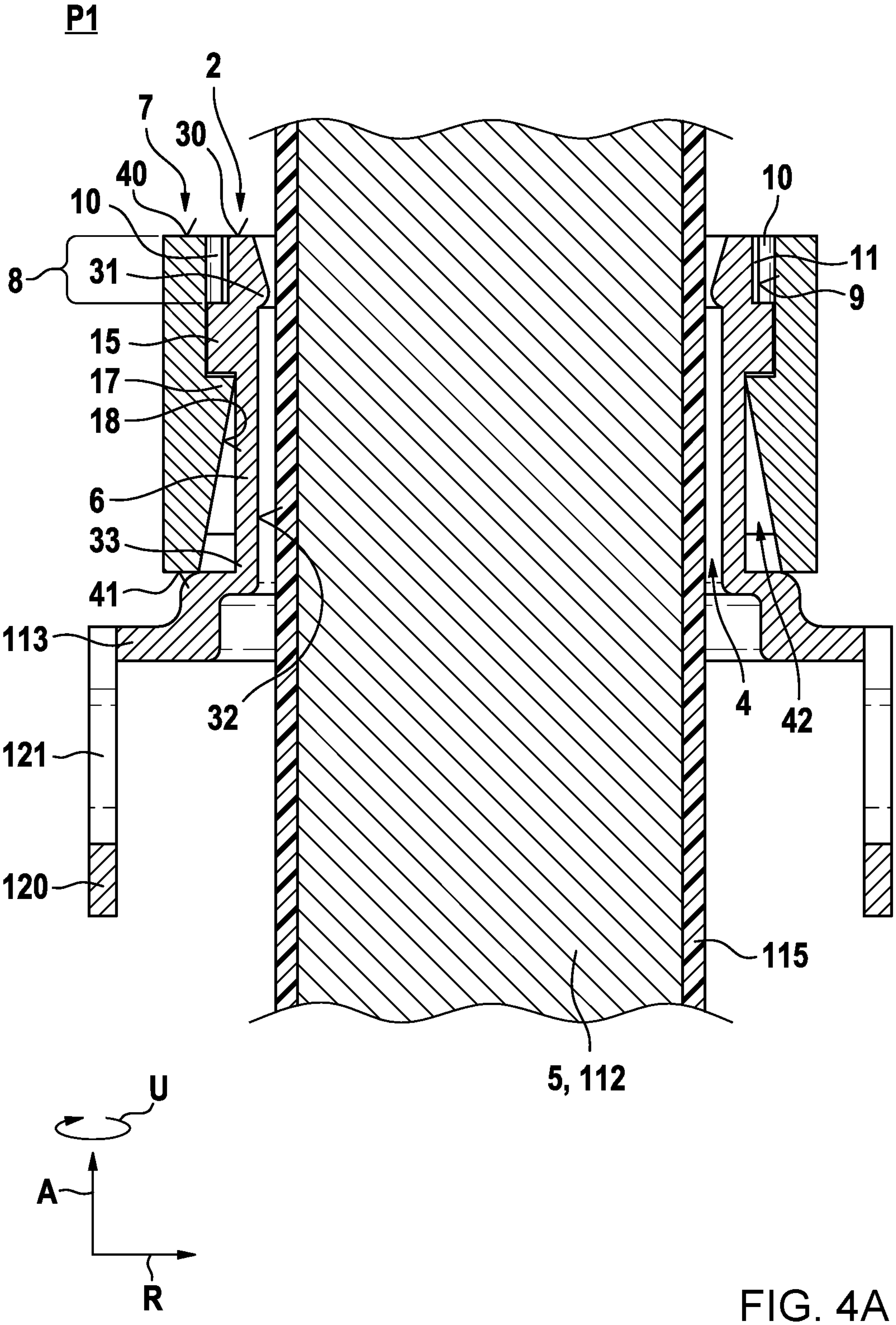
FIGS. 4A and 4B show schematic longitudinal sections through a strain relief device in an open state (FIG. 4A) and in a clamped state (FIG. 4B), according to an example embodiment of the present invention.
Figure 4B:
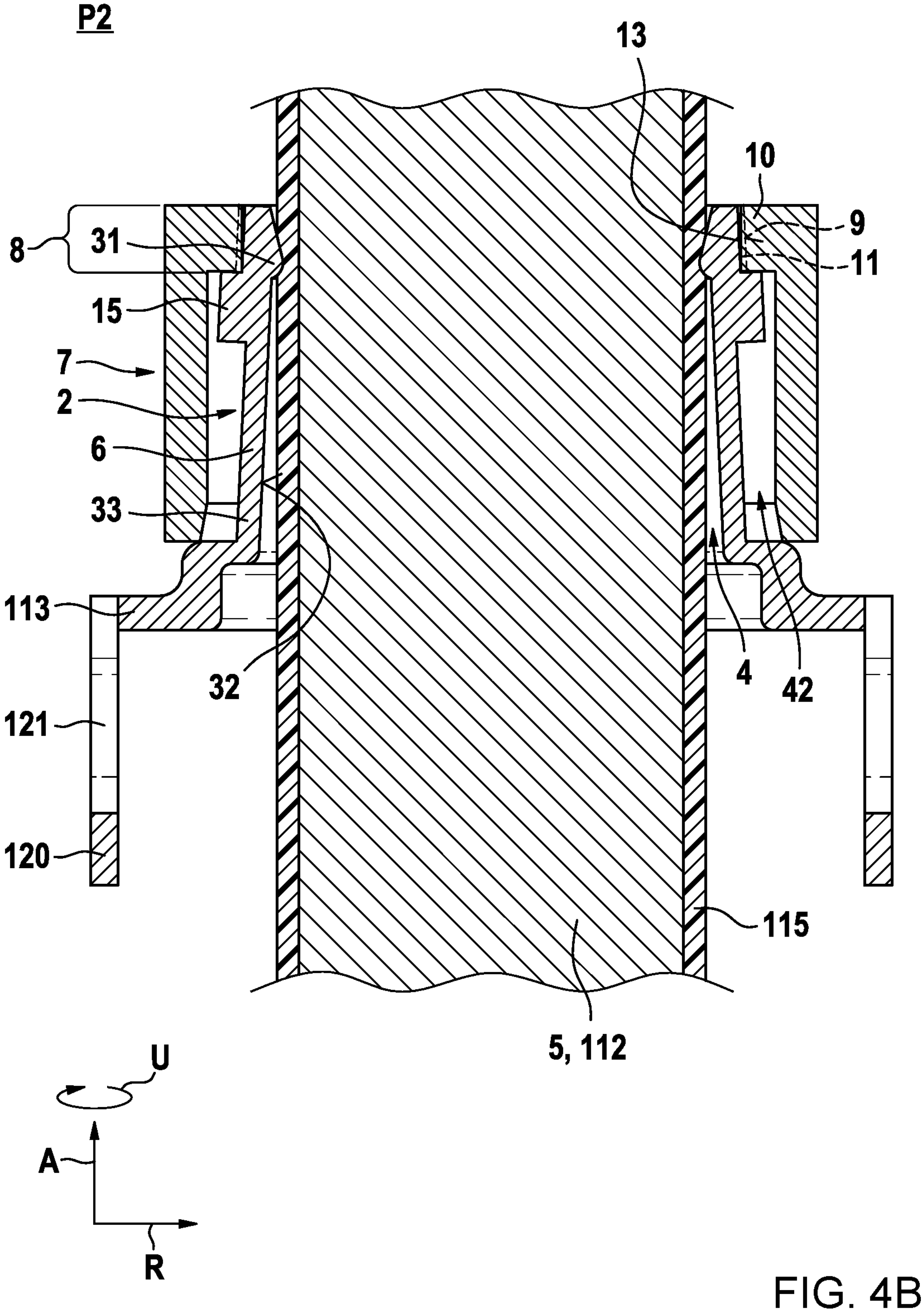

FIGS. 4A and 4B show schematic longitudinal sections through a strain relief device in an open or non-clamping state in the first position P1 (FIG. 4A) and in a clamped state, here in the second position P2 (FIG. 4B).

In FIG. 4A, it can be seen that the two visible projections 10 are not yet, or are only loosely, in contact with the outer side 9 of the corresponding lamellae 6. The lamellae 6 are spaced apart from the strand-shaped element 5 or lie only loosely on the strand-shaped element 5 (e.g., on an insulation 115 of a cable 112).

In FIG. 4B, it can be seen that the two visible projections 10 are coupled with their latching portion 12 to the outer side 9 of the lamellae 6 and have displaced the lamellae 6 away from the clamping body 7 or radially inward or toward the strand-shaped element 5. Lamellae 6 opposite one another thus clamp the strand-shaped element 5 between them. In principle, it is also sufficient for only a single lamella 6, or lamellae 6 situated next to one another, to be displaced and to clamp the strand-shaped element 5 between itself and a fixed structure.

It is also clearly seen in FIGS. 4A and 4B that the clamping body 7 is held captive (in the axial direction A), but rotatably (in the direction of rotation U), by the cooperation of the first and second captive anti-loss projections 15, 17 on the lamella element 2, wherein in FIG. 4B the two second captive anti-loss projections 17 shown in FIG. 4A are rotated out of the image plane. They overlap with first captive anti-loss projections 15 of other lamellae 6.

FIG. 5 shows a schematic perspective view of a plug connector 100 with a strain relief device 1.

The (electrical) plug connector 100 is designed for plugging or coupling to an (electrical) mating plug connector (not shown here). It has a plug connector housing 110 with a feed-through opening 111 for feeding through a cable 112, and a strain relief device 1 as described by way of example above. In the embodiment shown, the plug connector 100 has two strain relief devices 1 that are separate from one another. It can also be seen that a cable 112 is guided through each strain relief device 1 as a strand-shaped element 5, into a cable-side end 114 of the plug connector housing 110. The cable 112 has for example an insulation 115, visible here on its outer side. Viewed from the outside in, it can have for example the insulation 115, an (optional) shielding conductor, and one or more electrical conductors.

The strain relief device 1 is here fastened to the plug connector housing 110, by way of example. Here it is detachably fastened to the plug connector housing 110, by way of example. By way of example, the plug connector housing 110 can serve as a fixed structure into which the forces and/or torques absorbed by the strain relief device 1 are introduced.

By way of example, the plug connector 100 here has an end cap 113 which covers the cable-side end 114 of the plug connector housing 110. As an example, the two strain relief devices 1 are here, as already described above, formed in one piece with a respective end cap 113 (they could in principle also be formed separately from the end caps 113, or they could be formed together with a single end cap). The releasable attachment of the end cap 113 and thus also of the strain relief device 1 to the plug connector housing 110 is effected here, by way of example, by the tabs 120 of the end cap 113 with their recesses 121, which can be attached or clipped to the latching projections 122 of the plug connector housing 110.

The strain relief device 1 arranged on the front cable 112 in FIG. 5 is shown in the first position P1 (open state or non-clamping state), while the strain relief device 1 arranged on the rear cable 112 is shown in the second position P2 (clamping state).

Although not shown here, the connector 100 may have at least one contact chamber e.g., inside the connector housing 110. It can have at least one contact element. The contact element can for example be connected to the cable 112. The contact element can for example be designed (e.g., arranged at a contact-side end of the plug connector housing 110) to be plugged or coupled to a mating contact element of the mating plug connector.

The strain relief device 1 is not limited to use in plug connectors 1, but can also be used in pipes, lines, cables, and other strand-shaped elements 5. A preferred use can be a use for or on or with an (electrical) plug connector 100.

The inveintion claimed is:

1. A strain relief device for a plug connector, the strain relief device comprising:

a lamella element including a base element with a through-opening, which is set up for a feeding through of a strand-shaped element substantially parallel to an axial direction, and a lamella which projects from the base element along the axial direction; and a clamping body, which is annular in shape, and is arranged rotatably on the lamella element radially outside the lamella;

wherein the lamella, in a front portion facing away from the base element, is ramp-shaped on its outer side facing the clamping body in a direction of rotation, with a distance to the through-opening that increases along the direction of rotation, wherein the clamping body has at least one projection projecting radially inward, which is set up to couple with the front portion of the lamella when there is a rotation of the clamping body and to displace the lamella in a direction away from the clamping body.

2. The strain relief device according to claim 1, wherein the lamella element has a plurality of lamellae, outer sides of which are ramp-shaped in a front portion in the direction of rotation, wherein the clamping body has a plurality of inwardly projecting projections, wherein the projections are set up to couple with the front portions of corresponding lamellae when there is a rotation of the clamping body along the direction of rotation and to displace the corresponding lamellae in a direction away from the clamping body.

3. The strain relief device according to claim 1, wherein: (i) the lamella element does not have a thread for coupling with the clamping body, and/or (ii) the clamping body does not have a thread for coupling with the lamella element.

4. The strain relief device according to claim 1, wherein the outer side has at least one rib in the front portion of the lamella, and wherein the projection of the clamping body has a latching portion at a free projection end, which is set up to couple with the at least one rib in such a way that the clamping body is prevented from rotating opposite the direction of rotation.

5. The strain relief device according to claim 1, wherein the projection has a projection run-up slope which faces an outside of the front portion of the lamella.

6. The strain relief device according to claim 1, wherein the lamella has a first captive anti-loss projection on its outer side, wherein the clamping body has a second captive anti-loss projection on its clamping body inner side facing the lamella, wherein the second captive anti-loss projection is arranged between the first captive anti-loss projection and the base element, viewed in the axial direction, and wherein the first captive anti-loss projection and the second captive anti-loss projection overlap with one another in such a way that the clamping body is held captive on the lamella element.

7. The strain relief device according to claim 6, wherein the second captive anti-loss projection has a captive anti-loss run-up slope facing the base element.

8. The strain relief device according to claim 1, wherein the lamella element includes a stop element, wherein the clamping body includes a counter-stop element, and wherein the stop element and the counter-stop element are configured to cooperate with one another in such a way that they limit an angular range of rotation of the clamping body when there is a rotation of the clamping body around the lamella element along the direction of rotation.

9. The strain relief device according to claim 8, wherein the stop element is formed on the front portion of the lamella and projects in the radial direction toward the clamping body, and wherein the counter-stop element projects radially inward from the clamping body.

10. The strain relief device according to claim 1, wherein the clamping body has a profiling on an outer side of the clamping body, the profiling being selected from the following group: (i) an outwardly projecting wing, (ii) a plurality of outwardly projecting wings, (iii) a slot, (iv) a plurality of slots, (v) a polygonal profile, (vi) a triangular profile, (vii) a tetragonal profile, (viii) a pentagonal profile, (ix) a hexagonal profile, (x) a heptagonal profile, (xi) an octagonal profile, (xii) a nonagonal profile, (xiii) a decagonal profile.

11. A plug connector, the plug connector comprising:

a plug connector housing with a feed-through opening for feeding through a cable; and a strain relief device, including:

a lamella element including a base element with a through-opening, which is set up for a feeding through of a strand-shaped element substantially parallel to an axial direction, and a lamella which projects from the base element along the axial direction, and a clamping body, which is annular in shape, and is arranged rotatably on the lamella element radially outside the lamella, wherein the lamella, in a front portion facing away from the base element, is ramp-shaped on its outer side facing the clamping body in a direction of rotation, with a distance to the through-opening that increases along the direction of rotation, and wherein the clamping body has at least one projection projecting radially inward, which is set up to couple with the front portion of the lamella when there is a rotation of the clamping body and to displace the lamella in a direction away from the clamping body.

12. The plug-in connector according to claim 11, wherein the strain relief device is releasably fastened to the plug connector housing.

13. The plug-in connector according to claim 11, wherein the plug-in connector has an end cap which covers a cable-side end of the plug-in connector housing, and wherein the strain relief device is formed integrally with the end cap.

* * * * *